US010275230B2

(12) United States Patent
Mani et al.

(10) Patent No.: US 10,275,230 B2
(45) Date of Patent: Apr. 30, 2019

(54) CACHE AWARE SELF-REFERENTIAL STRUCTURE PEELING

(71) Applicant: Advanced Micro Devices, Inc., Sunnyvale, CA (US)

(72) Inventors: Suresh Mani, Karnataka (IN); Dibyendu Das, Karnataka (IN); Shivarama Rao, Karnataka (IN); Ashutosh Nema, Karnataka (IN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 95 days.

(21) Appl. No.: 15/650,368

(22) Filed: Jul. 14, 2017

(65) Prior Publication Data

US 2019/0018664 A1 Jan. 17, 2019

(51) Int. Cl.
*G06F 9/44* (2018.01)
*G06F 8/41* (2018.01)
*G06F 12/0802* (2016.01)

(52) U.S. Cl.
CPC .............. *G06F 8/4442* (2013.01); *G06F 8/43* (2013.01); *G06F 12/0802* (2013.01)

(58) Field of Classification Search
CPC .................................................. G06F 8/4442
USPC ........................................................ 717/151
See application file for complete search history.

(56) References Cited

U.S. PATENT DOCUMENTS

| 5,313,585 | A | * | 5/1994 | Jeffries | G11B 19/02 711/112 |
| 5,313,626 | A | * | 5/1994 | Jones | G06F 11/1092 714/5.11 |
| 5,485,619 | A | * | 1/1996 | Lai | G06F 8/433 717/150 |
| 5,506,977 | A | * | 4/1996 | Jones | G06F 11/1076 711/155 |
| 5,530,960 | A | * | 6/1996 | Parks | G06F 11/22 710/5 |
| 5,581,778 | A | * | 12/1996 | Chin | G06F 9/3885 712/16 |
| 5,974,544 | A | * | 10/1999 | Jeffries | G06F 11/1092 710/10 |

(Continued)

OTHER PUBLICATIONS

Chakrabarti, G. et al., "Structure Layout Optimizations in the Open64 Compiler: Design, Implementation and Measurements," Proceedings of the Open64 Workshop, International Symposium on Code Generation and Optimization, Apr. 6-9, 2008, 11 pages, Boston, MA, USA.

(Continued)

*Primary Examiner* — Evral E Bodden
(74) *Attorney, Agent, or Firm* — Volpe and Koenig, P.C.

(57) ABSTRACT

Methods of compiling source code are provided. A method includes identifying a first array of structures (AOS), having a plurality of array elements, each array element being a structure with a plurality of fields, and performing structure peeling on the first AOS to convert a data layout of the first AOS to an array of structure of arrays (AOSOA) including a plurality of memory blocks of uniform block size. At least one of the plurality of memory blocks is allocated for each field of the plurality of fields. The method further includes allocating a number of complete memory blocks to accommodate all of the plurality of array elements of the AOS.

20 Claims, 11 Drawing Sheets

(56) References Cited

U.S. PATENT DOCUMENTS

| | | | |
|---|---|---|---|
| 6,507,947 B1* | 1/2003 | Schreiber | G06F 8/452 |
| | | | 717/159 |
| 8,910,135 B2 | 12/2014 | Lai | |
| 2008/0052693 A1* | 2/2008 | Archambault | G06F 8/443 |
| | | | 717/151 |
| 2008/0154928 A1* | 6/2008 | Bashyam | H03M 7/30 |

OTHER PUBLICATIONS

Golovanevksy, O. et al., "Struct-reorg: current status and future perspectives," Proceedings of the GCC Developers Summit, Jul. 18-20, 2007, 12 pgs., Ottawa, ON, CA.

Lattner, C., "Macroscopic Data Structure Analysis and Optimization," Doctoral Dissertation, University of Illinois at Urbana-Champaign, 2005, 226 pgs., Urbana, IL, USA.

* cited by examiner

Ptr += x; ⟶ 
```
{ void *NewPtr;
  long ModOffset;
  Ptr += (x / Array_len) * CompBlockSize;
  NewPtr = Ptr + ((x % Array_len) * LargestFieldSize);
  ModOffset = (NewPtr / BSize == Ptr / BSize) ? 0 : TailBlkSize;
  Ptr = NewPtr + ModOffset;
}
```

Ptr -= x; ⟶
```
{ void *NewPtr;
  long ModOffset;
  Ptr -= (x / Array_len) * CompBlockSize;
  NewPtr = Ptr -- ((x % Array_len) * LargestFieldSize);
  ModOffset = (NewPtr / BSize == Ptr / BSize) ? 0 : TailBlkSize;
  Ptr = NewPtr - ModOffset;
}
```

Ptr1 - Ptr2 ⟶
```
long Subtract (Node* Ptr1, Node* Ptr2)
{
    long Offset;
    long TmpPtr2;
    long sign = 1;

if (Ptr2 > Ptr1) {
        swap(Ptr1, Ptr2);
        sign = -1;
    }

Offset = ((Ptr1 - Ptr2) / CompBlockSize);
    TmpPtr2 = Ptr2 + (Offset * CompBlockSize);
    Offset = Offset * Array_len * LargestFieldSize;

Offset += (Ptr1 / BSize == TmpPtr2 / BSize) ? (Ptr1 - TmpPtr2) :
                                                  (Ptr1 - TmpPtr2 - TailBlkSize);

Offset = (Offset / LargestFieldSize);
    return Offset * sign;
}
```

FIG. 8

CACHE AWARE SELF-REFERENTIAL STRUCTURE PEELING

BACKGROUND

Structure peeling is a compiler optimization which modifies the data layout of structures to minimize the number of cache misses and to improve the program performance. Structure peeling is done in cases where certain set of fields are accessed frequently at different places in the program. Generally, structure peeling converts an array of structures (AOS) to structure of arrays (SOA). However some of the existing self-referential structure peeling strategies have limitations.

First, some existing self-referential structure peeling strategies are context sensitive and are limited in applicability to situations where only a single instance of AOS exists. Further, they are not applicable to situations where multiple instances of AOSs (all of same data type) exist with complex interconnectivity among them.

Second, some existing self-referential structure peeling strategies require memory pool management routines with special capabilities that ensures that all the SOA of a certain data type are all placed contiguously in memory. This can be achieved by reserving huge memory for all the AOSs of a specific data type, which could lead to inefficient use of memory and fragmentation. Alternatively, memory is allocated to a required size initially and then resized when required. However, this involves a large number of unnecessary memory move operations and this could degrade the runtime performance of the application.

Further, in some existing self-referential structure peeling strategies, associated field values may be placed at a large distance from each other. However, this could cause unnecessary page faults in certain situations and degrade the runtime performance of the application.

Thus, an improved approach to self-referential structure peeling may be desirable.

BRIEF DESCRIPTION OF THE DRAWINGS

A more detailed understanding can be had from the following description, given by way of example in conjunction with the accompanying drawings wherein:

FIG. 8 illustrates pseudo code for modeling a structure pointer in accordance with the example illustrated in FIG. 7;

DETAILED DESCRIPTION

Figure 1:
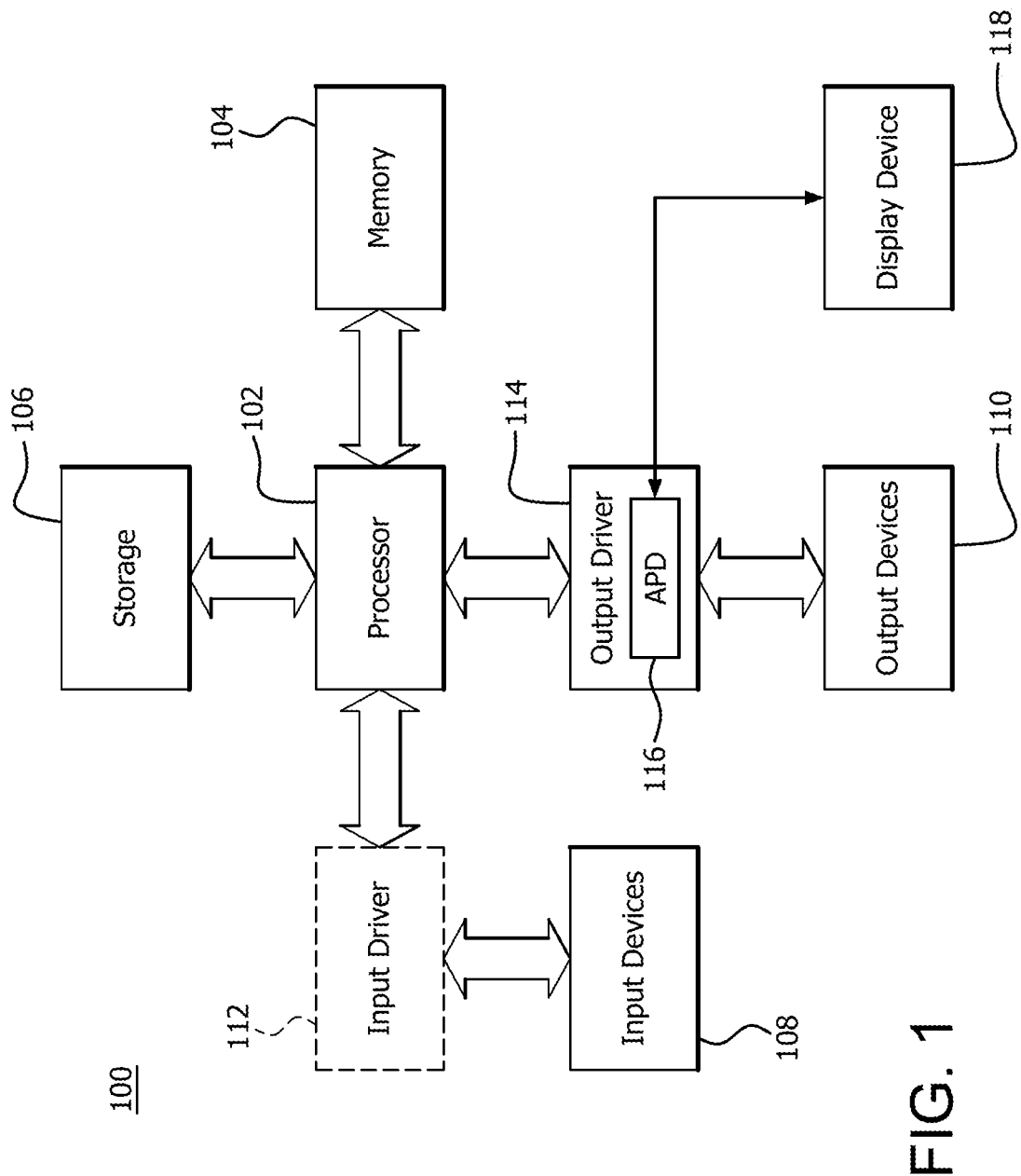
FIG. 1 is a block diagram of an example device in which one or more features of the disclosure can be implemented.

Self-referential structure peeling, as disclosed herein, may generally be implemented in a compiler, and, more specifically, in a low-level virtual machine (LLVM) based performance compiler, such as an LLVM central processing unit (CPU) performance compiler.

A compiler is a program that processes statements written in a particular programming language (i.e., source code) and turns them into machine language or "code" that a computer processor uses. When executing (running), the compiler first parses (or analyzes) all of the language statements syntactically one after the other and then, in one or more successive stages or "passes", builds the output code, making sure that statements that refer to other statements are referred to correctly in the final code. Traditionally, the output of the compilation is called object code which is a machine code that the processor (e.g., a CPU, graphics processing unit (GPU) or an accelerated processing unit (APU)) can execute. Machine code or machine language is a set of instructions executed directly by the processor. Each instruction performs a specific task, such as a load, a jump or an arithmetic-logic unit (ALU) operation on a unit of data in a processor register or memory. Every program directly executed by the processor is made up of a series of such instructions.

A performance compiler is a compiler that optimizes some attributes to an executable computer program. For example, a performance compiler may be configured to minimize the time taken to execute a program and/or to minimize the amount of memory occupied. Compiler optimization is generally implemented using a sequence of optimizing transformations, algorithms which take a program and transform it to produce a semantically equivalent output program that uses fewer resources.

For example, structure peeling is a compiler optimization technique which modifies the data layout of structures to minimize the number of cache misses and improve the program performance. In particular, structure peeling is an optimization where a structure is divided into several ones to improve data locality (i.e., in order to reduce cache misses). "Hot" data (frequently accessed) is separated from "cold" data (seldomly accessed) into two structures to improve the efficiency of the cache, by maximizing the probability of cache hits. A structure is a software construct having multiple fields, which can be of different field types. An example would be a structure in which the fields of the structure represent information related to a person, such as name, age, address, and favorite websites.

As used herein, a compiler refers to a processor configured to execute a compiler program and execute compiler functionality according to the compiler program (e.g., to physically change a data layout of structures of interest).

According to one or more examples, a method of compiling source code is provided. In particular, the method includes identifying a first array of structures (AOS), having a plurality of array elements, each array element being a structure with a plurality of fields, and performing structure peeling on the first AOS to convert a data layout of the first AOS to an array of structure of arrays (AOSOA) including a plurality of memory blocks of uniform block size. At least one of the plurality of memory blocks is allocated for each field of the plurality of fields. In addition, the structure peeling includes selecting a first field having a largest field size from among the plurality of fields, calculating a number of first fields having the largest field size that are accommodated into the uniform block size, and conforming a set of memory blocks of the plurality of memory blocks as a complete memory block. A different memory block of the set of memory blocks is allocated for each field of the plurality of fields, and each different memory block is configured to accommodate a number of fields equal to the number of first fields that are accommodated into the uniform block size. The method further includes allocating a number of complete memory blocks to accommodate all of the plurality of array elements of the AOS. Thus, enough complete memory blocks are allocated to accommodate all of the array elements of the AOS.

In addition, a computer readable storage medium is provided that includes computer-executable instructions that in response to execution, cause a computer system to perform the compiler operations of the above method.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a CPU, a GPU, a CPU and GPU located on the same die (e.g., an APU), or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
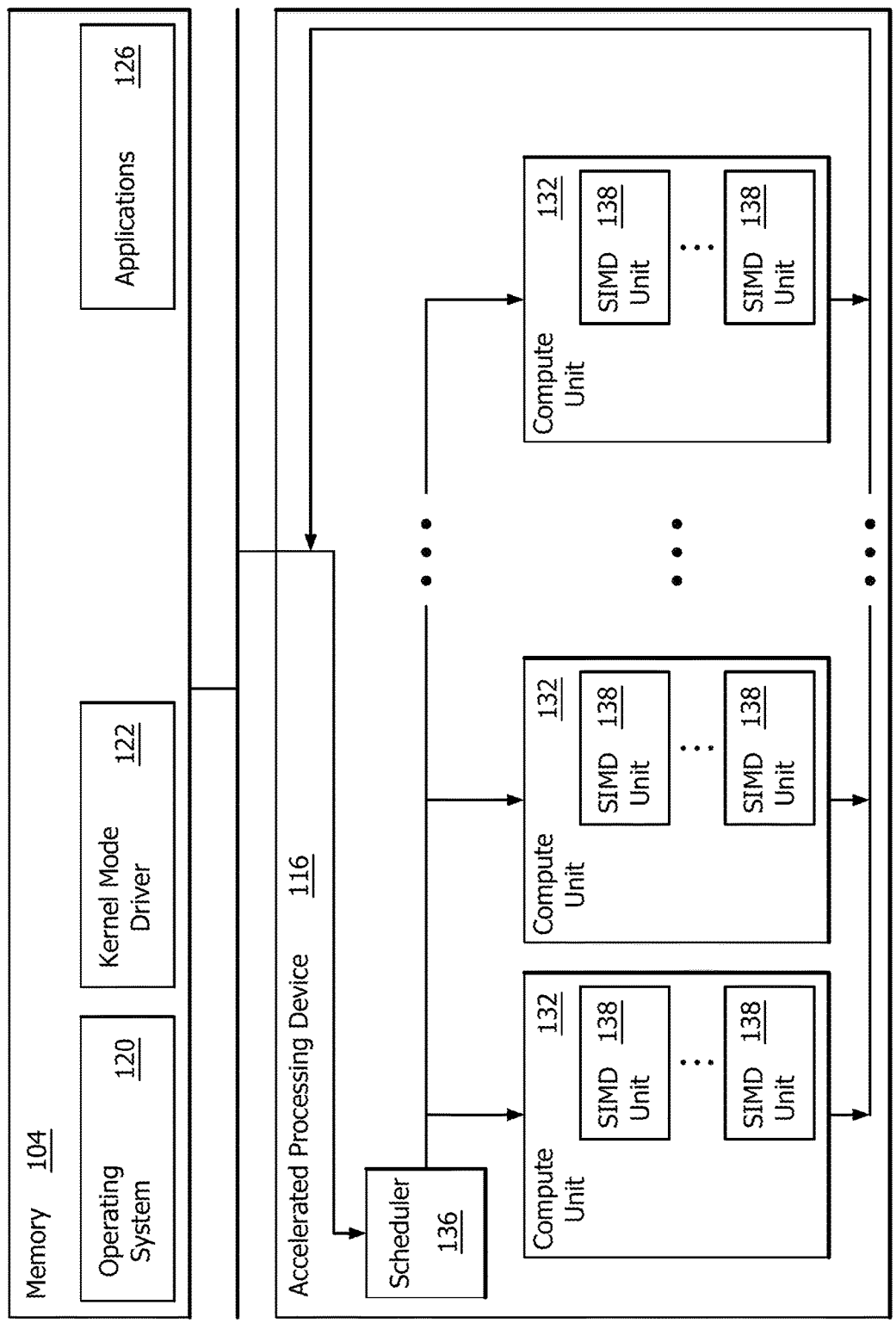
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls an operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The compute units 132 are also used to perform computation tasks not related to graphics. An application 126 or other software executing on the processor 102 transmits programs that define such computation tasks to the APD 116 for execution.

Compiler structure layout optimizations involve changing the physical layout of the structure of interest, for example, structure splitting, structure peeling, structure field reordering, and structure instance interleaving, etc. A compiler analyzes the usages of the structures to determine if it is legally feasible and if an advantage of performing the optimization is worth the overhead of the new layout. Thus, a compiler according to the embodiments described herein is configured to physically re-layout the fields of the structures of interest.

Figure 3:
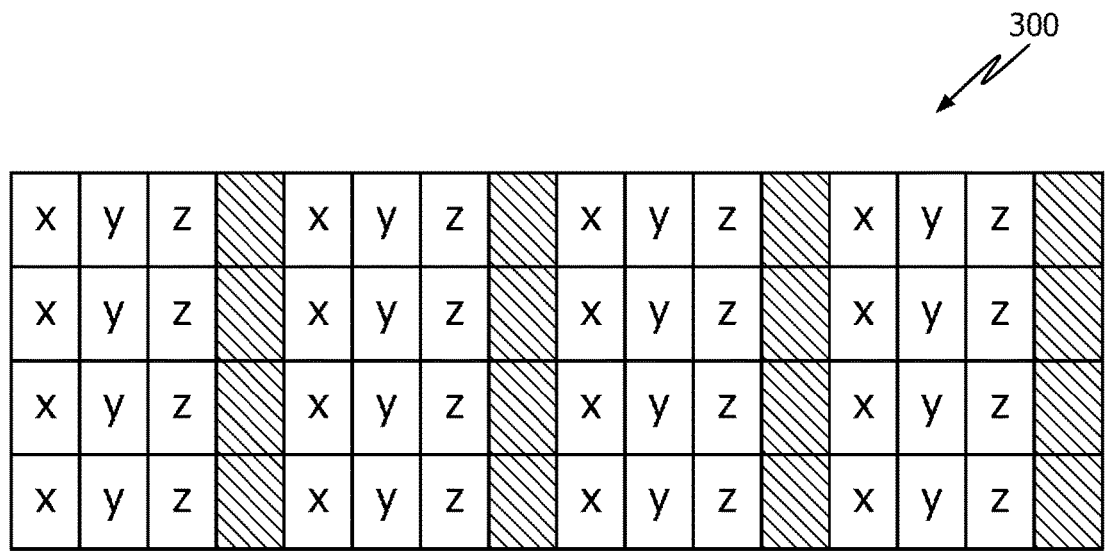
FIG. 3 illustrates an original data layout of an array of structures (AOS) according to one or more embodiments.

FIG. 3 illustrates a data layout of structures, referred to as an array of structures (AOS) 300 or simply an array. In programming logic (i.e., pseudo code), the AOS 300 is represented as follows:

typedef struct node {long x; struct node *y; int z;} Node;
Node Arr_a[N];

In this example, the AOS 300, also referred to as array Arr_a, is made up of sixteen nodes N (i.e., N=16). In addition, the AOS 300 includes three fields or original data types: long x ("x"), struct node *y ("y") and int z ("z"), as well as spacer fields (blank fields), following each last field (e.g., each z field), used for alignment. Thus, in AOS 300, each Node is depicted as a single column that includes data from a same field data type (e.g., the x, y or z field data type)

Figure 4:
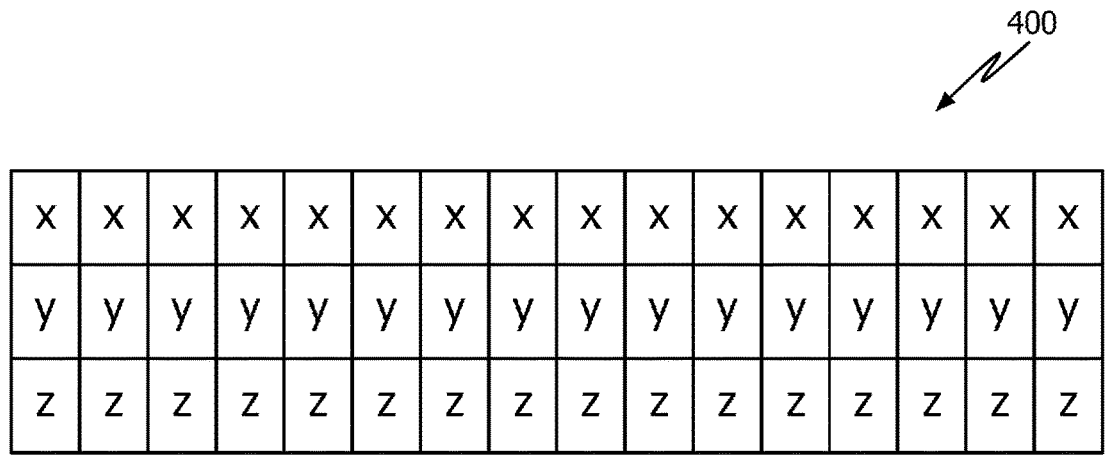
FIG. 4 illustrates a conventional approach of structure peeling.

FIG. 4 illustrates a conventional approach of structure peeling in which an AOS is converted to a non-uniform data layout, referred to as a structure of arrays (SOA) 400. Using AOS 300 as the array to be converted and assuming N=16, each field x, y and z from AOS 300 is arranged into a different row of the SOA 400. However, in this approach, structure pointers are modeled as array indexes. Modeling structure pointers using array indexes is context-sensitive according to a data layout and does not handle generic cases where multiple instances of AOSs exist where the AOSs have the same data types. Even if this approach is extended to handle multiple AOS instances (all of the same data type), generated code may only be capable of understanding the memory layout of one array or the other, but not all SOAs (e.g., since N could be different for each AOS). In order for code to be able to understand all SOAs, the multiple SOAs would need to be combined into a single SOA and use a contiguous or sequential memory pool so that a pointer to a node N would still be an index into one of the arrays.

The structure peeling demonstrated in FIG. 4 has a number of disadvantages. This approach needs to be context sensitive if all AOS instances are not placed contiguously and this limits its applicability in certain situations. Freeing memory of any AOS instance could create memory fragmentation if all AOS instances are placed contiguously. A large chunk of memory may have to be reserved for peeling a certain data type, and further allocation, reallocation and resizing would require large memory copy operations. In addition, determining the exact size of pool optimally is not be always feasible which limits this approach from being generic. Furthermore, this approach requires special memory pool management strategies and routines, which could increase the runtime of the program. Lastly, there could be performance degradation due to increased number of page faults if an associated field's values are not in a same memory page, in cases where AOS instances are large.

Figure 5:
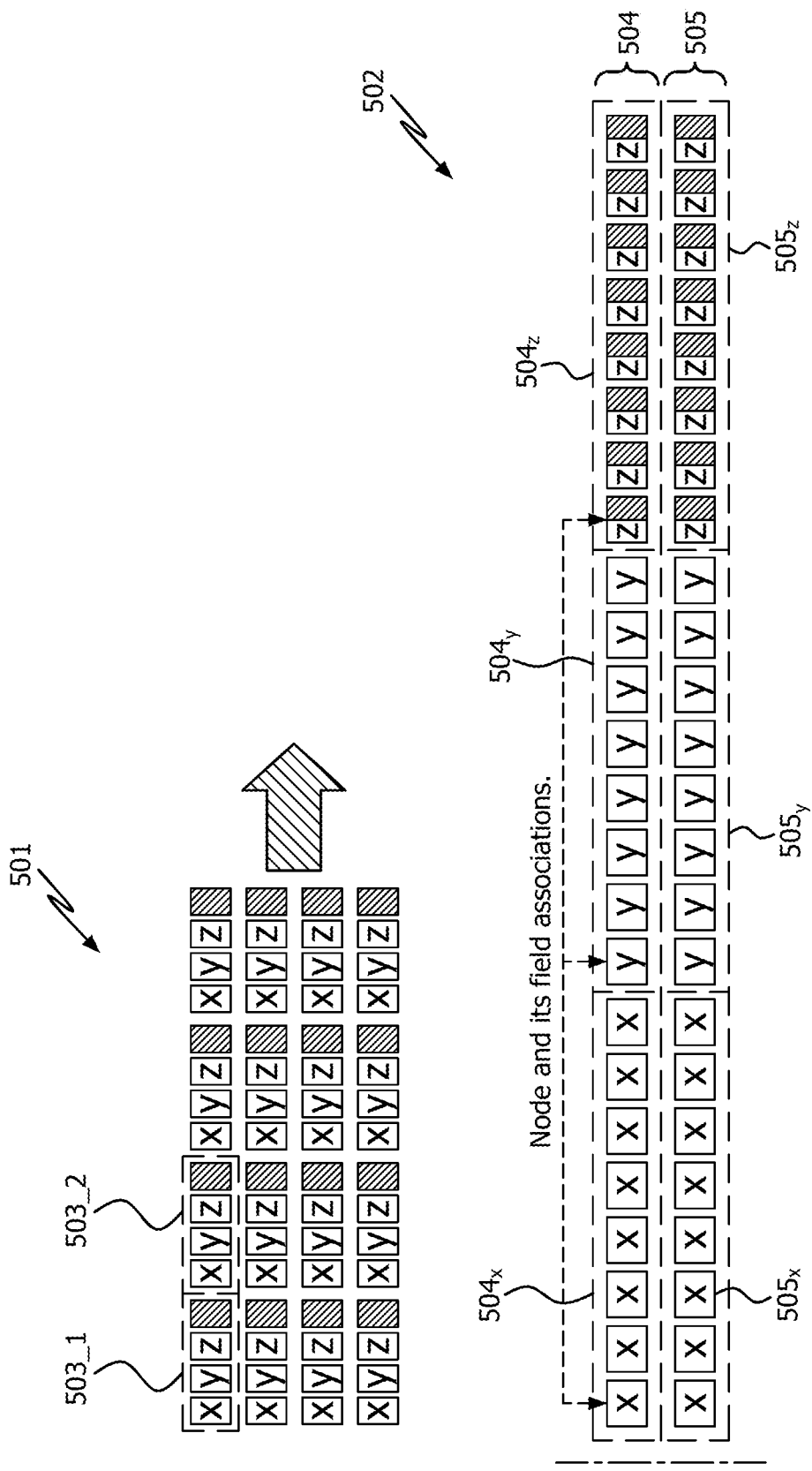
FIG. 5 illustrates a structure peeling technique during which a data layout is converted from an AOS to an array of structure of arrays (AOSOA) according to one or more embodiments.

FIG. 5 illustrates a structure peeling technique during which a data layout is converted from an AOS to an array of structure of arrays (AOSOA) according to one or more embodiments. In particular, a compiler converts an AOS 501 into the AOSOA 502. For example, as similarly described in FIG. 3, AOS 501 contains multiple fields (e.g., x, y and z). In a first structure 503_1, x, y and z fields of that structure are said to be associated with each other due to their proximity with one another (e.g., contiguously one after another) in the AOS 501. The first structure 503_1 of x, y and z fields includes a spacer field following the last data field z to provide alignment between structures 503 within the AOS 501. The AOS 501 is thus formed by this array of structures 503. In this example, the number of nodes N=16, which further corresponds to the number of structures.

Here, the AOS 501 is converted into the AOSOA 502 by dividing the AOS 501 into memory blocks 504x, 504y, 504z, 505x, 505y and 505z (collectively referred to as complete memory blocks 504 and 505, respectively) of equal size B to form the AOSOA 502. Size B or "Bsize" is a configurable or a selected memory block size in multiples of a cache line byte size (e.g., 64, 128, 512, 1024, 2048, etc). Bsize can also be considered as a block length. Thus, each allocated memory block 504x, 504y, 504z, 505x, 505y and 505z is aligned with the Bsize. Further, each memory block 504x, 504y, 504z, 505x, 505y and 505z contains data from its respective data field (e.g., x, y or z).

As an example, AOS 501 is represented by the following programming logic:

struct node {long x; struct node *y; int z;} Node;
Node Arr_a[N];

According to the conversion technique, the AOS 501 is converted into the AOSOA 502, which is represented by:

| { long Arr_a_x [B]; struct node * Arr_a_y [B]; int Arr_a_z [B]; } |
| // This is an SOA |
| AOSOA[N/B];    // This is an Array of SOA | where B is the number of x's (i.e., data field x's) that can be accommodated into the Bsize. Data type x is selected, by a data mining operation, out of the data field types to be correlated with B, since, in this case, data type "long" is the largest field in Node equal to 8 bytes. Thus, the compiler analyzes the length of each data field type, and selects the longest field type for determining B based on Bsize. For simplicity purposes, B is equal to 8 in this example where the cache line size is 64 bytes, but is not limited thereto. Thus, eight x's of 8 bytes can fit into a single cache line of 64 bytes.

In addition, a first set of eight x's of AOS 501 are placed in the first memory block 504x of complete memory block 504, their associated y's are placed in the next (second) block 504y of complete memory block 504 and their associated z's, along with spacer fields, are placed in the next (third) block 504z of complete memory block 504. Each memory block in the complete memory block 504 is aligned with the Bsize, in this case, a 64 byte boundary.

Similarly, a second set of eight x's of AOS 501 are placed in the second memory block 505x of complete memory block 505, their associated y's are placed in the next (second) block 505y of complete memory block 505 and their associated z's are placed in the next (third) block 505z of complete memory block 505. Each memory block in the complete memory block 505 is aligned with the Bsize, in this case, a 64 byte boundary. This process proceeds until all the elements in the AOS 501 are populated into the AOSOA 502.

Thus, associated fields (e.g., associated x, y and z data fields) share the same position (e.g., a first position, or a second position, and so on) within their respective memory block, and a complete memory block includes the first set of x's be that can be accommodated into the Bsize and their associated y and z data fields.

Figure 6:
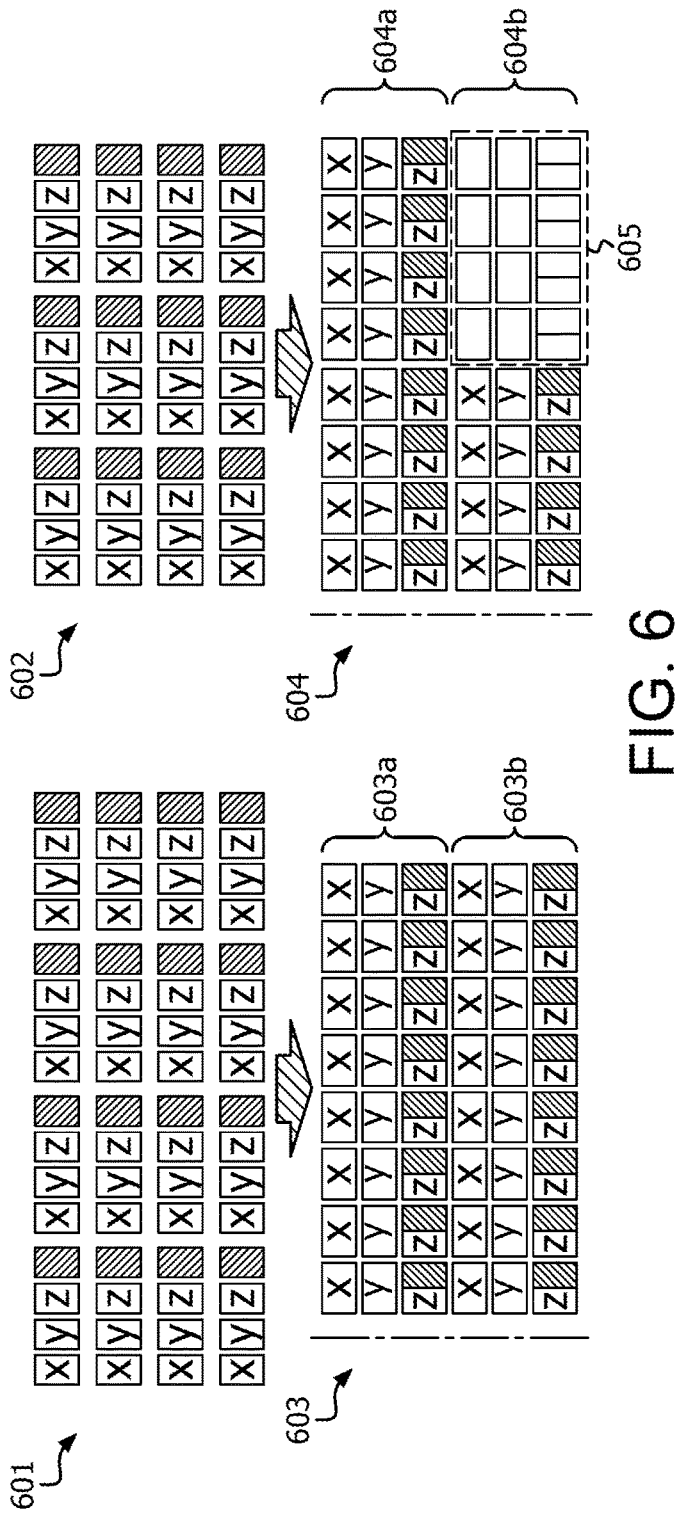
FIG. 6 illustrates a structure peeling technique in which multiple AOS instances (inclusive of all of the same data type(s)) are present according to one or more embodiments.

FIG. 6 illustrates the structure peeling technique in which there are multiple AOS instances (inclusive of all of same data type(s)) according to one or more embodiments. In particular, multiple AOSs, that are the same or different size, are converted into AOSOAs with a uniform layout. For example, FIG. 6 shows AOS 601 with a number of nodes N=16, and AOS 602 with a number of nodes N=12.

In addition, each AOS instance contains fields of the same data type and a same number of different data types. Thus, when the compiler searches for multiple AOS instances, it searches for AOS instance that meets these conditions. For example, with respect to FIG. 5, AOS 501 includes three different data types x, y and z. In the case shown in FIG. 6, the compiler is configured to search for AOSs that include three different date types that match (e.g., x, y and z). As stated above, each determined AOS instance can be the same or different size, so long as it contains fields of the same data type and a same number of different data types.

As shown in FIG. 6, the cache line size is 64 bytes, the Bsize of each memory block is set at 64 bytes, and B is again 8 for simplicity. However, the above values can changed based on implementation. Here, each AOS instance is converted into an AOSOA with blocks whose size is equal to Bsize. For example, AOS 601 is converted into an AOSOA 603 consisting of two complete memory blocks 603a and 603b. Due to the size of AOS 601, both complete memory blocks 603a and 603b are completely filled.

Similarly, AOS 602 is converted into an AOSOA 604 consisting of two complete memory blocks 604a and 604b. However, due to its smaller size, AOS 602, when converted, does not fill up the second memory block 604. In this case, unused memory is allocated for the conversion of AOS 602 as wasted free space 605. However, despite this wasted free space 605, AOSOA 603 and AOSOA 604 have a uniform data layout. Thus, a same code can understand both layouts of AOSOA 603 and AOSOA 604 due to their layout uniformity and AOSOA 603 and AOSOA 604 need not be placed in a contiguous memory pool to be understood by the program.

Figure 7:
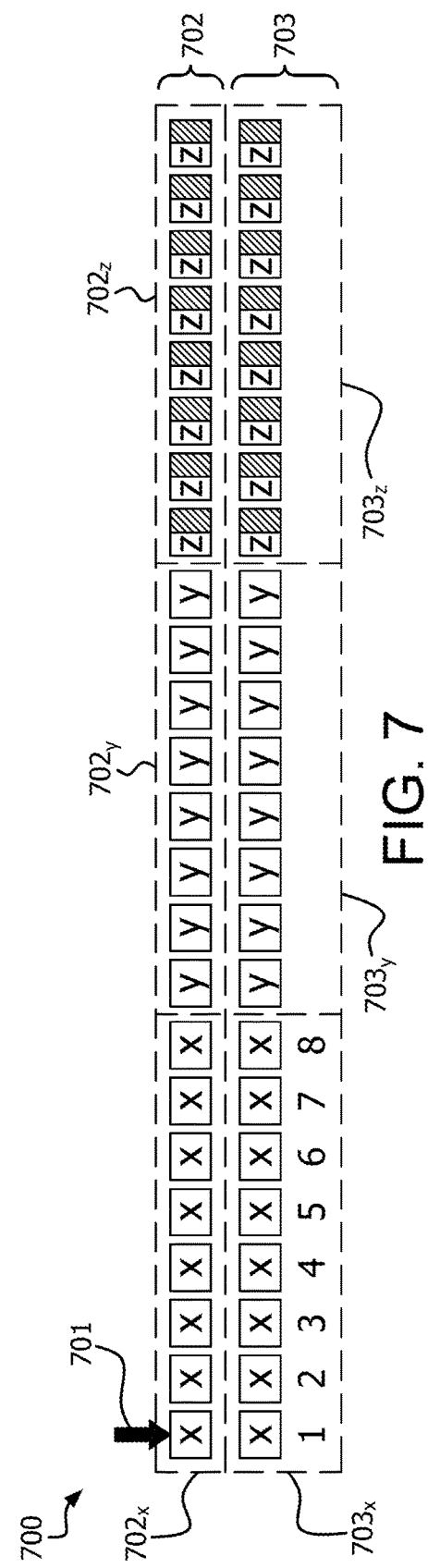
FIG. 7 illustrates an example of modular pointer arithmetic implemented for accessing a field in an AOSOA according to one or more embodiments.

FIG. 7 illustrates an example of modular pointer arithmetic implemented for accessing a field in an AOSOA 700 according to one or more embodiments. In particular, a structure pointer 701 is configured to initially point to an element in the first field array (i.e., memory block 702x) of complete memory block 702 (i.e., x in this example). Here, the structure pointer 701 contains actual address values of a data field for accessing and/or reading the data from memory.

FIG. 7 shows some of the possible places where structure pointer 701 could point. The modular pointer arithmetic implemented in FIG. 7 is represented in the following function:

Struct node *p=malloc(sizeof(node)*16);
p++; p+=4; p+=3; p+=4; p-=9;

where the structure pointer 701 initially points to the first x in (the first) memory block 702x, is next incremented by a single increment (p++) to the second x in memory block 702x, and is next incremented by an increment of 4 (p+=4) to the sixth x in memory block 702x. Next, the structure pointer 701 is incremented by 3 (p+=3). However, at this moment, the structure pointer 701 reaches the end of the memory block 702x and carries over to the next "x" field array, which is memory block 703x in the next complete memory block 703. Thus, the structure pointer 701 skips the memory blocks 702y and 702z, and moves to the next "x" memory block. Thus, the structure pointer 701 does not stray into blocks where other fields are stored, but instead moves within same field type (i.e., the first field type).

From the first x in memory block 703x, the structure pointer 701 is incremented by 4 (p+=4) to the fifth x in memory block 703x, and then decremented by 9 (p-=9) to the fourth x in memory block 702x. In the last operation, the structure pointer 701 moves from memory block 703x to memory block 702x by skipping memory blocks 702y and 702z.

The remaining fields y and z are accessed by performing address arithmetic on the structure pointer 701. For example, assuming Bsize is 64 bytes, the first y in memory block 702y may be accessed by adding 64 bytes (i.e., 1*Bsize) to the address value of the first x in memory block 702x to which the structure pointer 701 is pointing. Thus, to access a field in the second memory block of a complete memory block, a byte value of one Bsize is added to the address of the associated x field stored in the structure pointer.

Similarly, the first z in memory block 702z may be accessed by adding 128 bytes (i.e., 2*Bsize) to the address value of the first x in memory block 702x. Thus, to access a field in the third memory block of a complete memory block, a byte value of two Bsizes is added to the address of the associated x field stored in the structure pointer.

Thus, any y or z field may be accessed by applying addition arithmetic to the address of its corresponding or associated x field to which the structure pointer 701 is pointing. As a result of this arrangement, associated data fields (e.g., associated x, y and z fields) are in a proximity to each other in the AOSOA such that they are more likely to be located on a same memory page.

FIG. 8 illustrates an example of pseudo code for modeling a structure pointer in accordance with the example illustrated in FIG. 7. The structure pointer is configured to initially point to an element in the first field array (i.e., memory block 702x) of a first complete memory block 702 in FIG. 7. Thus, in this example, the structure pointer Ptr is configured to initially point to the first x field in the first memory block of the first complete memory block. As noted above, each memory block is aligned to Bsize to enable the pseudo code to work properly. This uniformity in size further helps to detect start or end of a memory block.

The structure pointer Ptr contains the actual address of a first data field (e.g, an address of a first x data field in the above examples). Thus, an x data field is accessed at an offset (BSize*0) bytes from address in structure pointer Ptr. A y data field is accessed at an offset (BSize*1) bytes from an address in structure pointer Ptr, and a z data field is accessed at an offset (BSize*2) bytes from an address in structure pointer Ptr.

The following is a pseudo code to access individual field values, where "FieldNo" is a function which returns the field number which is 0 for x, 1 for y and 2 for z:

Ptr->a; {Ptr+BSize*FieldNo(a);}

It will be appreciated that, in the above embodiments, there are three fields but the number of fields is not limited thereto, and may be less than or greater than three.

As described above, a compiler converts an AOS (e.g., AOS 300) into the AOSOA. For example, as described in FIG. 3, an AOS contains multiple fields (e.g., x, y and z). In the case of multiple AOSs, each AOS may be a different size (i.e., each may have a different number of nodes N). In this case, the programming logic for multiple AOSs can be as follows:

typedef struct node {long x; struct node *y; int z;} Node;
Node Arr_a [N], Arr_b [N1], Arr_c [N2];

where three arrays Arr_a, Arr_b and Arr_c (i.e., AOS instances) have a number of nodes N, N1 and N2, respectively, that can be the same or different.

Upon transformation by the compiler, executed by one or more processors, the AOS are converted according to the following programming logic:

```
long LargestFieldSize = max( sizeof(long), sizeof(Node*), sizeof(int));
                                // max size of fields in Node
long Array_len = BSize / LargestFieldSize;
                                // Number of elements in a block
``` where Bsize is the configurable memory block size used for each AOSOA.

As a result of the transformation, one complete memory block of an AOSOA is represented as:

```
struct { long x [Array_len];    // sizeof (array x) == BSize, first block
         long y [Array_len];    // sizeof (array y) == BSize, second block
         long z [Array_len];    // sizeof (array z) == BSize, third block
} CompBlock;                    // one complete block
```

The complete memory block includes a set of memory blocks where one memory block of the set is assigned for each associated field from the AOS. In this case, the complete memory block includes a set of three memory blocks, one for each of the x, y and z associated data fields. In addition, all the fields conceptually are shown as "long", but may be any data type. Data type "long" is selected, by a data mining operation, because it is the largest field among the data fields in Node and provides a picture of the memory reserved. Further, the allocated memory blocks are aligned to "BSize". Array_len represents a length of each array (i.e., a number of largest data fields or elements that can be accommodated in a single memory block of a complete memory block). In this case, the largest data field is "long". Thus, each memory block is reserved to accommodate the same number of data fields Array_len, dependent on the size of the largest data field and Bsize (i.e., the number of largest data fields that fit into Bsize).

This structure peeling approach is applicable for structures that contain fields whose size is a power of 2 (1/2/4/8/16 bytes), which is the case for most standard data types.

In the following example, the following programming variables for pointer arithmetic are used:

```
long CompBlockSize = sizeof(CompBlock);        // One Complete
                                                  block size
long TailBlkSize = CompBlockSize - BSize;      // Tail block size
int ExtLen = N % Array_len ? 1 : 0;            // Additional block
int ExtLen1 = N1 % Array_len ? 1 : 0;          // Additional block
int ExtLen2 = N2 % Array_len ? 1 : 0;          // Additional block
CompBlock Arr_a [(N / Array_len) + ExtLen];
CompBlock Arr_b [(N1 / Array_len) + ExtLen1];
CompBlock Arr_c [(N2 / Array_len) + ExtLen2];
``` where, variable Array_len again represents a length of an array (i.e., a number a data fields or elements that can be accommodated in a single memory block of a complete memory block) and variable ExtLen indicates whether an additional complete memory block is to be reserved.

Figure 9:
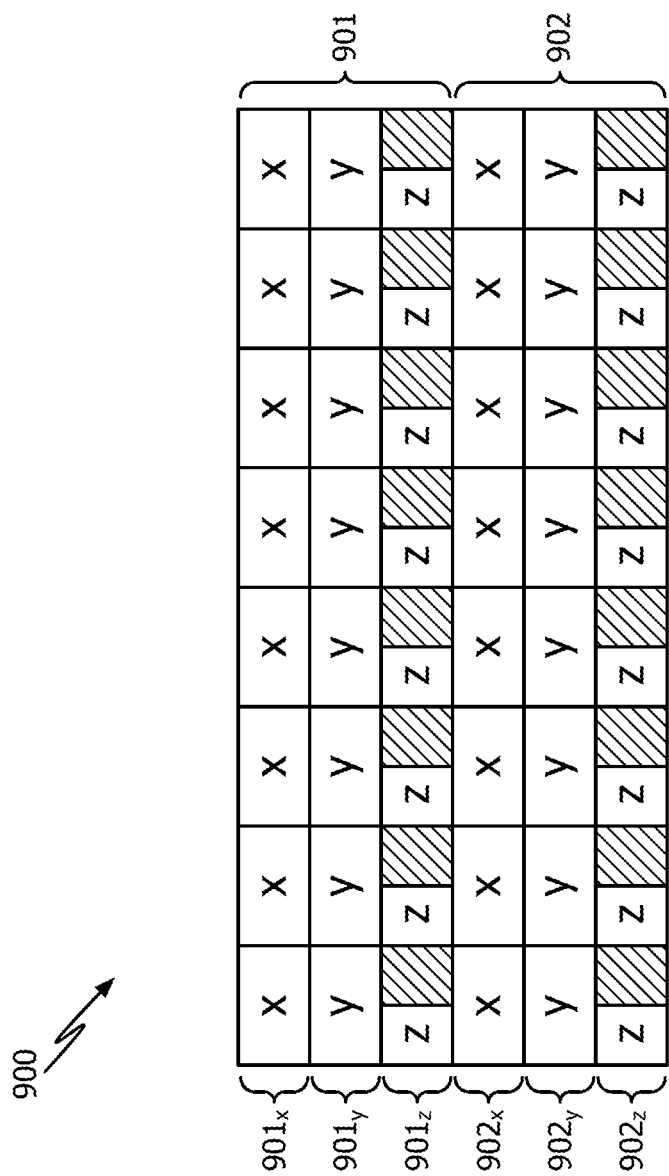
FIG. 9 illustrates a data layout of an AOSOA after structure peeling according to one or more embodiments.

FIG. 9 illustrates a data layout of an AOSOA 900 after structure peeling according to one or more embodiments. In particular, AOSOA 900 is an alternate representation of AOSOA 603 that is transformed by the compiler from AOS 601, as illustrated in FIG. 6.

AOSOA 900 shows data arranged in two complete memory blocks 901 and 902. Complete memory block 901 includes a memory block 901x, 901y, 901z for each data field type. In addition, the last memory block 901z includes a space field following each z data field, where the spacer fields are used for alignment. Similarly, complete memory block 902 includes a memory block 902x, 902y, 902z for each data field type. In addition, the last memory block 902z includes a spacer field following each z data field, where the spacer fields are used for alignment.

In FIG. 9, "BSize" is 64 bytes and the AOS is Node Arr_a[16] for simplicity of explanation. However, it will be appreciated that the Bsize and Array size are configurable and not limited thereto. The AOSOA 900 is represented by the following programming variables:

```
long LargestFieldSize = 8;      // size of (long) since long is the largest
                                   field;
long Array_len = 8;             // 64 / 8;
long CompBlockSize = 192;       // 64 *3;
long TailBlkSize = 128;         // 192 − 64;
int ExtLen = 0;                 // 16 % 8 ? 1 : 0;
CompBlock Arr_a [2];            // 2 = 16 / 8 + 0.
```

As discussed above, the variable LargestFieldSize is the size (bytes) of the largest data field in the original data type Node and the variable Array_len is the number of largest data field elements (long) that can fit into Bsize (e.g., 64 bytes). The number of nodes N is 16.

The variable CompBlockSize is the total size of a complete block (e.g., 901 and 902). Since there are three field types, there are three memory blocks in a complete block, each with a 64 byte Bsize. Thus, the CompBlockSize is 192 in this example.

The variable TailBlkSize is calculated by subtracting the Bsize from the CompBlockSize. The variable TailBlkSize aids in pointer arithmetic operations such that a number of bytes between "x" memory blocks is known. When a structure pointer moves from one "x" memory block to a next or previous "x" memory block, the structure pointer does so by adding or subtracting the TailBlkSize to or from its address value. This basically results in the structure pointer skipping over memory blocks that contain associated y and z data fields.

The integer ExtLen is a variable of either 0 or 1 that indicates whether an additional complete memory block is to be reserved to accommodate all the nodes of the AOS. For example, by dividing the number of nodes N of the AOS by the Array_len, a remainder is either present or not present. If a remainder clue to the division is not present, ExtLen is 0 and an additional complete memory block is not needed. On the other hand, if a remainder clue to the division is present, ExtLen is 1 and an additional complete memory block is added to reserved memory for the AOSOA.

CompBlock Arr_a [(N/Array_len)+ExtLen] is the number of complete memory blocks that are reserved in memory. If variable ExtLen is a "1", an additional complete block is added to the number of CompBlock Arr_a [ ]. In the example shown in FIG. 9, ExtLen is 0 and CompBlock Arr_a [2], indicating two complete blocks are reserved for the structure peeling.

Figure 10:
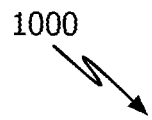
FIG. 10 illustrates a data layout of an AOSOA after structure peeling according to one or more embodiments.

In contrast, FIG. 10 illustrates a data layout of an AOSOA 1000 after structure peeling Node Arr_b[18] in another example. In particular, AOSOA 1000 shows data arranged in three complete memory blocks 1001, 1002 and 1003. AOSOA 1000 can be generated in an environment of multiple AOS instances where AOSOA 900, derived from Arr_a[16], is also present. Here, BSize is 64 bytes and Node Arr_b[18]. That is the number of nodes N for AOS Arr_b is 18. As a result, ExtLen is equal to 1 and CompBlock Arr_b [3], as shown below:

long LargestFieldSize=8; // size of (long) since long is the largest field.
    long Array_len=8; // 64/8;
    long CompBlockSize=192; // 64*3
    long TailBlkSize=128; // 192−64
    int ExtLen=1; // 18% 8 ? 1:0;
    CompBlock Arr_b [3]; // 3=16/8+1

Thus, first N/Array_len complete blocks are allocated and, subsequently, an additional block is allocated if N is not a multiple of Array_len. As can be seen, third complete block 1003 is reserved a result of ExtLen being equal to 1. However, while a third complete block 1003 is reserved in order to accommodate the remaining data fields, the third complete block 1003 is not completely filled. Instead, the remaining portion of the third complete block 1003 are reserved for the AOSOA but are left empty as wasted space. Despite this wasted free space, AOSOA 1000 and AOSOA 900 have a uniform data layout (e.g., 8 elements in a memory block). Thus, a same code can understand both layouts of AOSOA 900 and AOSOA 1000 due to their layout uniformity.

Figure 11:
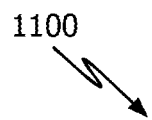
FIGS. 11-13 show examples of an AOSOA derived from various sized AOS in a multiple instance AOS environment according to one or more embodiments.
Figure 12:
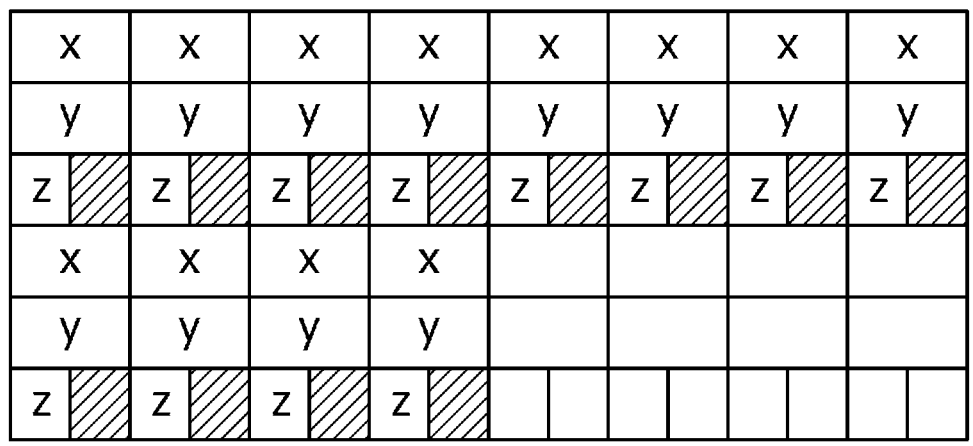
Figure 13:
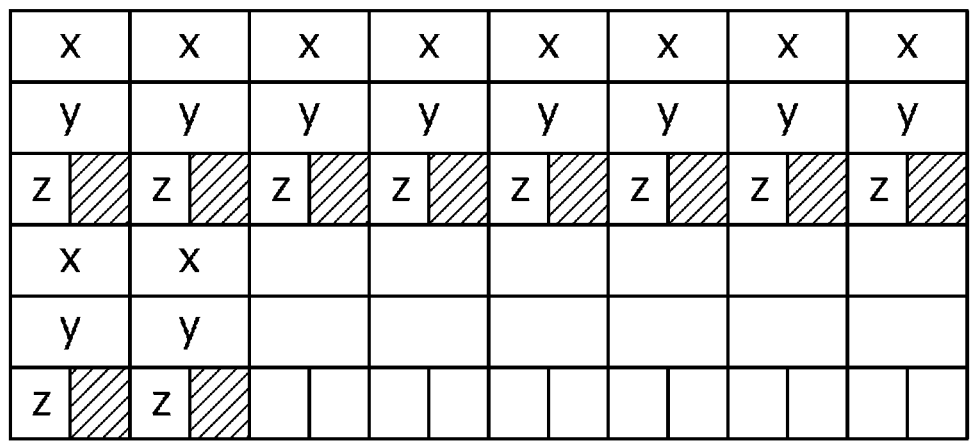

FIGS. 11-13 show additional examples of an AOSOA derived from various sized AOS in a multiple instance AOS environment according to one or more embodiments. In particular, FIG. 11 illustrates an AOSOA 1100 converted from an AOS Node Arr_d[15], FIG. 12 illustrates an AOSOA 1200 converted from an AOS Node Arr_e[12] and FIG. 13 illustrates an AOSOA 1300 converted from an AOS Node Arr_f[10].

The memory allocated for Arr_d[15], Arr_e[12] and Arr_f [10] in FIGS. 11-13 are independent of each other, could be placed at any arbitrary location in memory and need not be contiguous. Furthermore, context sensitivity issues do not arise here since Arr_d, Arr_e and Arr_f all have a uniform data (memory) layout. Hence, a common piece of transformed code in a program will be able to access any AOSOA Arr_d, Arr_e or Arr_f using actual addresses values, as opposed to index values.

In addition, the data format of each AOSOA remains generic and does not require pool management routines. Further, the block size (Bsize) could be tuned to a specific machine for optimal performance. Also, since the associated or related field values (e.g., associated x, y and z field values) are placed closer to each other, the number of page faults and cache misses can be reduced.

Figure 14:
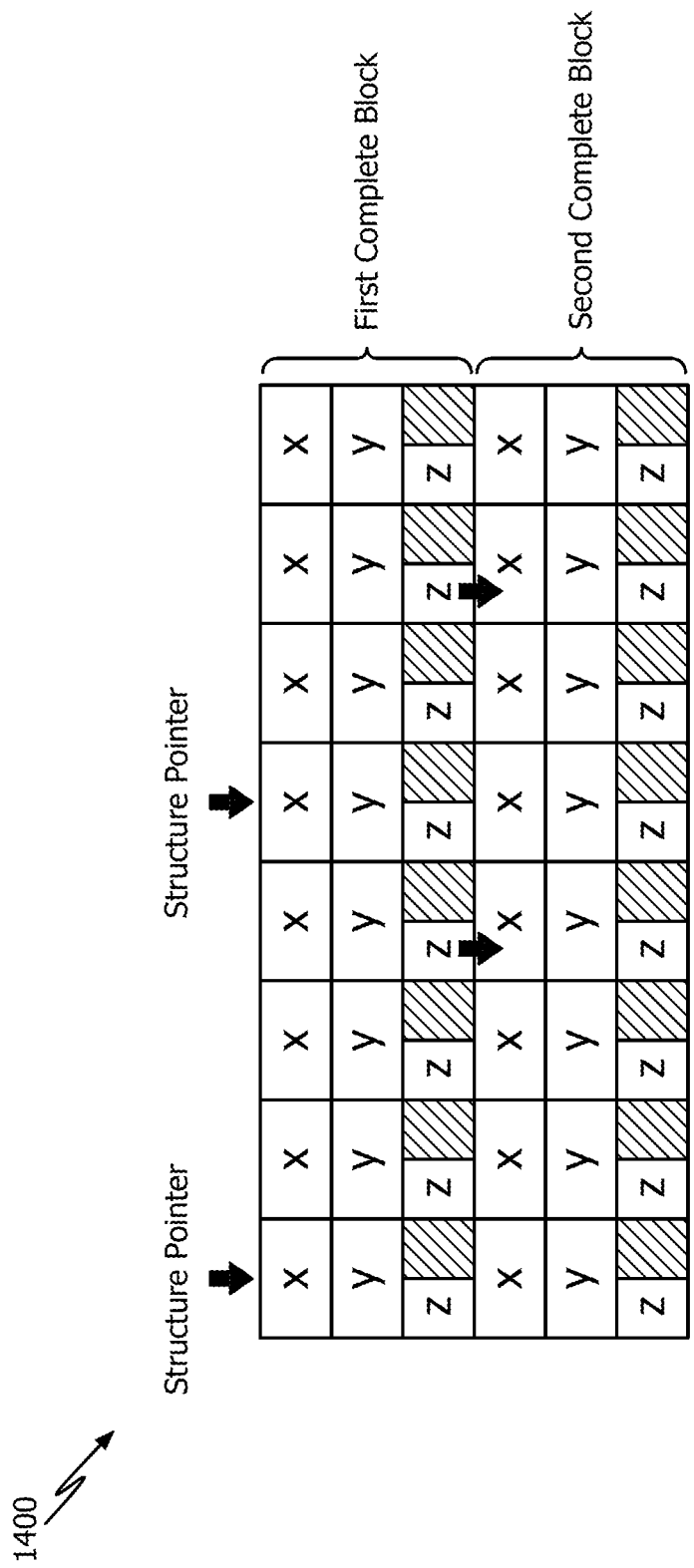
FIG. 14 illustrates a modeling a structure pointer according to one or more embodiments.

FIG. 14 illustrates an example of modeling a structure pointer according to one or more embodiments. In particular, like FIG. 7, FIG. 14 shows some of the possible places where a structure pointer could point to in an AOSOA 1400. Like FIG. 7, the structure pointer is configured to initially point to an element in the first field array (i.e., x in this example) of the first complete memory block. Here, the structure pointer contains actual address values of the data field for accessing and/or reading the data from memory.

At no point in time does the structure pointer point to a y or z field. Instead, fields y and z are accessed by performing address arithmetic on this pointer based on the address of their associated x field to which the structure pointer points. For example, assuming Bsize is 64 bytes, the first y in the first complete memory block may be accessed by adding 64 bytes (i.e., 1*Bsize) to the address value of the first x in the first complete memory block. Similarly, the first z in the complete memory block may be accessed by adding 128 bytes (i.e., 2*Bsize) to the address value of the first x in the complete memory block. Thus, any y or z field may be accessed by applying addition arithmetic to the address of its corresponding or associated x field to which the structure pointer points. This allows access to the fields in a context-free way using simple arithmetic. Thus, the pseudo code illustrated in FIG. 8 applies to the example shown in FIG. 14.

Figure 15:
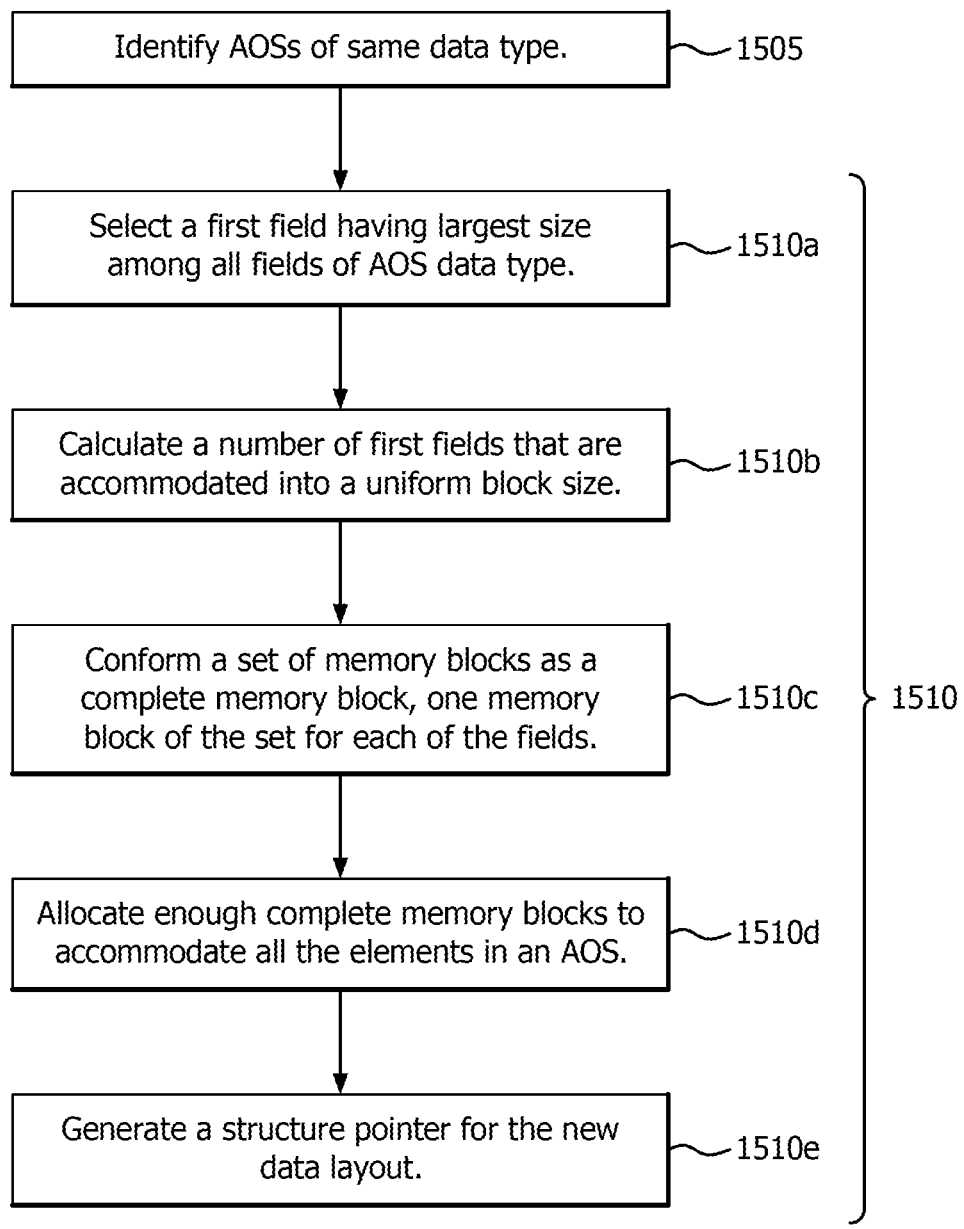
FIG. 15 illustrates a flow diagram of a method of compiling source code using structure peeling according to one or more embodiments.

FIG. 15 illustrates a flow diagram of a method 1500 of compiling source code using structure peeling according to one or more embodiments. The method includes identifying, by a compiler, one or more AOSs, having a plurality of array elements, each array element being a structure with a plurality of fields (operation 1505); and performing structure peeling, by the compiler, on each of the AOSs to convert a data layout of each AOS to an AOSOA (operation 1510). Each identified AOS includes the same data field type(s). The AOSOA includes a plurality of memory blocks of uniform block size, where at least one of the plurality of memory blocks allocated for each field of the plurality of fields.

The conversion operation 1510 further includes selecting a first field having a largest field size from among the plurality of fields (operation 1510a), calculating a number of first fields having the largest field size that are accommodated into the uniform block size (operation 1510b), and conforming a set of memory blocks to make up a complete memory bock, such that one memory block of the set is reserved for each field type (operation 1510c). Here, each memory block of the set accommodates a number of associated fields equal to the number of first fields that are accommodated into a uniform block size. The conversion operation 1510 also includes allocating enough complete blocks to accommodate all the elements of the AOS (operation 1510d). Thus, additional complete memory blocks are allocated as needed.

The conversion operation 1510 further includes generating a structure pointer that is configured to point to locations only within memory blocks that are allocated to the first fields having the largest field size (operation 1510e). Since each complete memory block includes a memory block that is reserved for the first field type, the structure pointer may move between complete memory blocks, but remains confined within the memory blocks that are actually reserved for the first field type. The structure pointer stores an actual address of a first field to which the structure pointer points.

The method of compiling source code is also configured to use structure peeling of multiple AOS instances that include the same data field types. Thus, each AOS instance is converted into an AOSOA that each are aligned with uniform size (i.e., Bsize).

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for compiling source code comprising:
   identifying, by a compiler, a first array of structures (AOS), having a plurality of array elements, each array element being a structure with a plurality of fields;
   identifying, by the compiler, a second AOS, having a second plurality of array elements, each second array element being the structure with the plurality of fields of a same type as the plurality of fields of the first AOS;
   performing a first structure peeling, by the compiler, on the first AOS to convert a data layout of the first AOS to a first array of structure of arrays (AOSOA) comprising a first plurality of memory blocks of uniform block size, at least one of the first plurality of memory blocks is allocated for each field of the plurality of fields of the first AOS; and
   performing a second structure peeling, by the compiler, on the second AOS to convert a data layout of the second AOS to a second AOSOA comprising a second plurality of memory blocks of the uniform block size, at least one of the second plurality of memory blocks allocated for each field of the plurality of fields of second AOS.

2. The method of claim 1, wherein performing the second structure peeling comprises:
   conforming the second plurality of memory blocks to the uniform block size independent from a size of the data layout of the second AOS.

3. The method of claim 1, wherein:
   each of the first plurality of memory blocks are configured to accommodate a first number of fields that are accommodated into the uniform block size; and
   each of the second plurality of memory blocks are configured to accommodate a second number of fields equal to the first number first fields.

4. The method of claim 1, further comprising:
   allocating a first number of complete memory blocks for the first AOSOA to accommodate all of the plurality of array elements of the first AOS; and
   allocating a second number of complete memory blocks for the second AOSOA to accommodate all of the plurality of array elements of the second AOS.

5. The method of claim 1, the first structure peeling comprising:
   selecting a first field having a largest field size from among the plurality of fields of the first AOS;
   calculating a number of first fields having the largest field size that are accommodated into the uniform block size;
   conforming a set of memory blocks of the first plurality of memory blocks as a complete memory block, wherein a different memory block of the set of memory blocks is allocated for each field of the plurality of fields of the first AOS, and each different memory block is configured to accommodate a number of fields equal to the number of first fields that are accommodated into the uniform block size; and
   allocating a number of complete memory blocks to accommodate all of the plurality of array elements of the first AOS.

6. The method of claim 5, wherein the first structure peeling further comprises:
   dividing the number of the plurality of array elements of the first AOS by the number of first fields that are accommodated into the uniform block size to calculate an array variable; and
   allocating the number of complete memory blocks to the first AOSOA based on the array variable, each complete memory block including a different memory block for each field of the plurality of fields of the first AOS.

7. The method of claim 6, wherein:
   the number of complete memory blocks is equal to the array variable if the array variable is a whole number, and
   the number of complete memory blocks is equal to a whole number portion of the array variable plus one if the array variable is a fraction.

8. The method of claim 6, wherein:
   on a condition the array variable is a fraction, each memory block of a last complete memory block of the first AOSOA includes an unused portion allocated to the first AOSOA.

9. The method of claim 1, further comprising:
   generating, for the first AOSOA, a structure pointer configured to point to locations only within memory blocks allocated to first fields selected among the first plurality of fields, wherein the structure pointer stores an actual address of a first field to which the structure pointer points.

10. The method of claim 9, further comprising:
    accessing one of the plurality of fields in the first AOSOA using the structure pointer, comprising:
    accessing the first field to which the structure pointer points by referring to the actual address of the first field to which the structure pointer points; and
    accessing an associated field of the first field to which the structure pointer points by adding a multiple of the uniform block size to the actual address of the first field to which the structure pointer points.

11. A computer readable storage medium comprising computer-executable instructions that in response to execution, cause a computer processor to perform compiler operations comprising:
    identifying a first array of structures (AOS), having a plurality of array elements, each array element being a structure with a plurality of fields; and
    identifying a second AOS, having a second plurality of array elements, each second array element being the structure with the plurality of fields of a same type as the plurality of fields of the first AOS;
    performing a first structure peeling on the first AOS to convert a data layout of the first AOS to a first array of structure of arrays (AOSOA) comprising a first plurality of memory blocks of uniform block size, at least one of the first plurality of memory blocks is allocated for each field of the plurality of fields of the first AOS, and performing a second structure peeling, by the compiler, on the second AOS to convert a data layout of the second AOS to a second AOSOA comprising a second plurality of memory blocks that are conformed to the uniform block size independent from a size of the data layout of the second AOS, at least one of the second plurality of memory blocks allocated for each field of the plurality of fields of second AOS.

12. The computer readable storage medium of claim 11, wherein performing the second structure peeling comprises: conforming the second plurality of memory blocks to the uniform block size independent from a size of the data layout of the second AOS.

13. The computer readable storage medium of claim 11, wherein:
   each of the first plurality of memory blocks are configured to accommodate a first number of fields that are accommodated into the uniform block size; and
   each of the second plurality of memory blocks are configured to accommodate a second number of fields equal to the first number first fields.

14. The computer readable storage medium of claim 11, the compiler operations further comprising:
   allocating a first number of complete memory blocks for the first AOSOA to accommodate all of the plurality of array elements of the first AOS; and
   allocating a second number of complete memory blocks for the second AOSOA to accommodate all of the plurality of array elements of the second AOS.

15. The computer readable storage medium of claim 11, the first structure peeling comprising:
   selecting a first field having a largest field size from among the plurality of fields of the first AOS;
   calculating a number of first fields having the largest field size that are accommodated into the uniform block size;
   conforming a set of memory blocks of the first plurality of memory blocks as a complete memory block, wherein a different memory block of the set of memory blocks is allocated for each field of the plurality of fields of the first AOS, and each different memory block is configured to accommodate a number of fields equal to the number of first fields that are accommodated into the uniform block size; and
   allocating a number of complete memory blocks to accommodate all of the plurality of array elements of the first AOS.

16. The computer readable storage medium of claim 15, wherein the first structure peeling further comprises:
   dividing the number of the plurality of array elements of the first AOS by the number of first fields that are accommodated into the uniform block size to calculate an array variable; and
   allocating the number of complete memory blocks to the first AOSOA based on the array variable, each complete memory block including a different memory bock for each field of the plurality of fields of the first AOS.

17. The computer readable storage medium of claim 16, wherein:
   the number of complete memory blocks is equal to the array variable if the array variable is a whole number, and
   the number of complete memory blocks is equal to a whole number portion of the array variable plus one if the array variable is a fraction.

18. The computer readable storage medium of claim 16, wherein:
   on a condition the array variable is a fraction, each memory block of a last complete memory block of the first AOSOA includes an unused portion allocated to the first AOSOA.

19. The computer readable storage medium of claim 11, the compiler operations further comprising:
   generating, for the first AOSOA, a structure pointer configured to point to locations only within memory blocks allocated to first fields selected among the first plurality of fields, wherein the structure pointer stores an actual address of a first field to which the structure pointer points.

20. The computer readable storage medium of claim 19, further comprising:
   accessing one of the plurality of fields in the first AOSOA using the structure pointer, comprising:
      accessing the first field to which the structure pointer points by referring to the actual address of the first field to which the structure pointer points; and
      accessing an associated field of the first field to which the structure pointer points by adding a multiple of the uniform block size to the actual address of the first field to which the structure pointer points.

* * * * *